June 9, 1936.  F. E. ALTMAN  2,043,916
OPTICAL SYSTEM
Filed Aug. 18, 1934
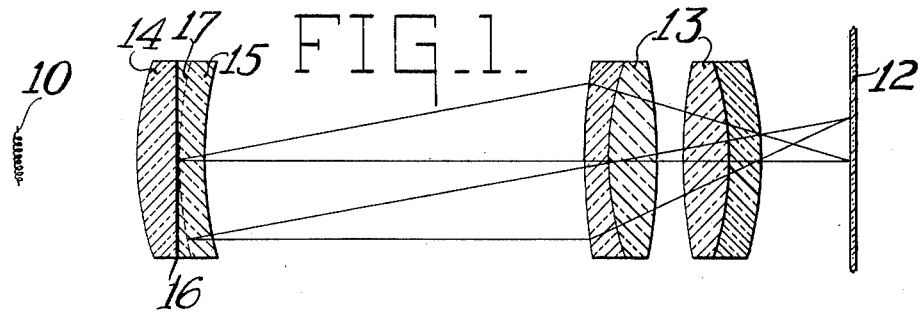
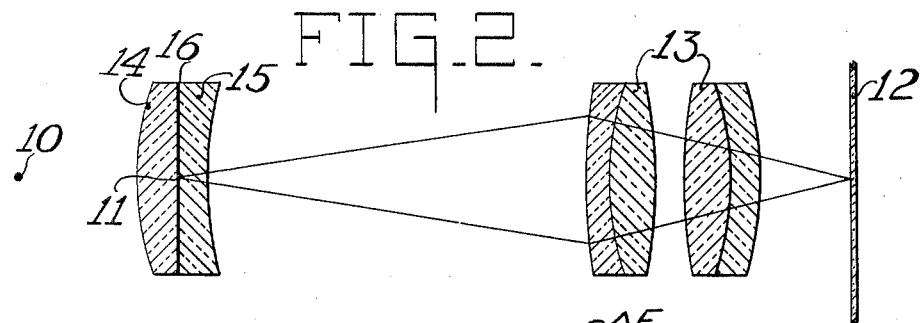
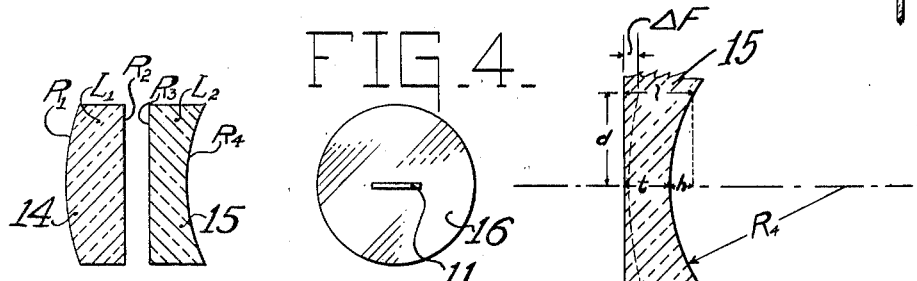
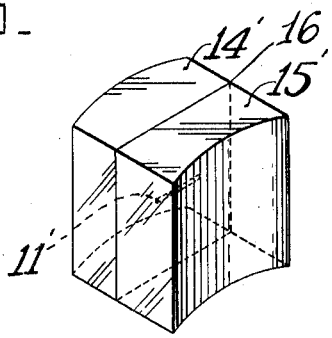
Inventor
Fred E. Altman,
By Newton M Perris
Rolla N. Carter
Attorneys Patented June 9, 1936

2,043,916

UNITED STATES PATENT OFFICE 2,043,916

OPTICAL SYSTEM

Fred E. Altman, Rochester, N. Y., assignor to Eastman Kodak Company, Rochester, N. Y., a corporation of New York Application August 18, 1934, Serial No. 740,477

3 Claims. (Cl. 88—24)

My present invention relates to optical systems and particularly to such optical systems as are employed on sound-on-film apparatus for producing a narrow linear image of a secondary light source upon an image area of the sound track of a motion picture film. More particularly my invention relates to an improved slit unit which is employed as a secondary light source in such an optical system.

In most systems of this general type, the image produced suffers in uniformity and sharpness due to curvature of field introduced by a lens system working at an aperture large enough for efficient operation.

One of the objects of my invention is to provide an improved slit means for use in an optical system. Another object of the invention is to provide an improved slit unit which will be useful as a secondary light source in sound-on-film optical systems. Still another object of the invention is to provide an improved slit unit in which the physical slit may be made larger than the effective slit, thereby improving the light efficiency of the system.

According to the invention, in order to flatten the image formed by a partially corrected lens, the slit of the secondary light source is optically curved so that it appears concave to the lens system. My invention will be fully understood from the following description when read in connection with the accompanying drawing, and its scope will be pointed out in the appended claims.

Fig. 1 is a vertical section of one form of the invention.

Fig. 2 is a horizontal section corresponding to Fig. 1.

Figs. 3 and 4 show the several elements of the slit unit.

Fig. 5 is a fragmentary view in section of an optical element used to optically curve the slit.

Fig. 6 is a view in perspective of a complete slit unit made in accordance with a modification of the invention.

In the drawing I have shown one embodiment of my invention as applied to an illuminating system for the sound track of a photographic film. This system, as shown in Figs. 1 and 2, comprises a source of light 10 for illuminating a slit 11, a reduced image of which is projected onto the sound track of a film 12 by means of suitable objective lens system 13.

The slit unit comprises a plano-convex lens element 14 and a plano-concave lens element 15 having their plano surfaces secured together and between which is mounted a thin sheet of opaque material 16 in which the physical slit 11 is formed.

When the objective lens 13 has the high light efficiency desired in this type of system, it ordinarily does not have a flat field, and if the secondary light source consisted only of the slit 11, the image of this slit, as formed by the objective 13, would be curved and the resulting illumination of the sound track on the film 12 would not be a sharp line of uniform thickness throughout.

The light slit unit of my invention removes this difficulty by providing the negative lens element 15 which causes the slit 11 to appear concave to the objective 13, and this concavity is such that the image formed by the objective 13 is a flat one. The plano-convex lens element 14, positioned in front of the slit 11, serves to keep the slit clean and also tends to concentrate on the slit the light coming from the source 10. It will be understood that the opaque coating 16 in which the slit 11 is formed is shown in exaggerated size in the drawing for the sake of clearness, and that the opaque coating 16 may consist of a very thin silver deposit in which the slit 16 is formed by scratching away a limited area of the silver.

As is well known, the plano-concave lens element 15 will form a virtual image of the slit 11, which image will be curved, as indicated by the dotted line 17 in Fig. 1. This curved image of the slit appears concave to the objective 13 and the curvature of the lens element 15 is so selected that the concavity of this virtual image exactly compensates for the curvature of the field of the objective 13. When the lens elements 14 and 15 are spherical, the slit 11 will, of course, appear concave along both its axes and will appear to be somewhat reduced in size, thereby making it possible to use a slit larger than would otherwise be possible and thereby recover the light efficiency which would ordinarily be lost due to the glass surfaces employed in the slit unit.

In Fig. 3 I have shown the two slit lens elements 14 and 15 separated from each other for the purpose of indicating the structural features which may be employed for making such elements which are suitable for use in my improved slit unit. In one suitable arrangement, both lens elements 14 and 15 are made of common crown glass having a refractive index for the D-line of 1.523 and a dispersion of 59.4. The radius $R_1$ of the convex surface is 11.66 mm., $R_2$ and $R_3$ are plano, and $R_4$ is 10.40 mm.

Fig. 4 merely shows the slit unit with the convex lens element 14 removed, as viewed from the light source 10.

To aid those skilled in the art to construct a slit unit in accordance with my invention, I have set out below the derivation of the formula for determining the proper radius of curvature for the plano-concave lens element 15.

Referring to Fig. 5, I may set out the following relationships:

Air equivalent of glass thickness $(t) = t/\mu$
Equivalent air path on axis $= t/\mu + h$
Equivalent air path at height $(d) = (t+h)/\mu$
The departure of the virtual image from the plane at $(d) = \Delta F''$
Then the $(t+h)/\mu = t/\mu + h - \Delta F''$,
Therefore, $R_4 = (d^2 + h^2)/2h$, where $\mu$ is the reciprocal of the dispersive power of the glass employed, $\Delta F$ is the departure from a plane of the field of the objective 13 at any distance $d$ off the optic axis, $t$ is the thickness of the lens on its optic axis, $h$ is the increase in thickness of the lens at distance $d$ off its axis, $R_4$ is the radius of curvature for the concave face of the lens required to form of its plano surface a virtual image having a curvature equal to the curvature of the field of the objective 13.

Exact triangulation and computation of the sagittal focus of the objective lens system 13 and the corrector lens 15 give a slightly more accurate value for $R_4$ as it takes account of the effect of the curvature of the dispersive surface on the sagittal focus.

Accuracy of the above formula as compared with exact triangulation and sagittal focus determination for a specific system is as follows: When $\Delta F''$ equals .0498, the value of $R_4$ as determined by the formula is 10.57, whereas by exact triangulation $R_4$ equals 10.40.

Although certain advantages are derived from the use of spherical surfaces on the lens elements 14 and 15, the most important function performed by the lens element 15 is the optically curving of the slit 11, and very good results may be obtained by using cylindrical lenses as shown in Fig. 6, in which the cylindrical axes are perpendicular to the greatest dimension of the slit 11.

If a very short system is employed, the angle subtended by the slit becomes sensibly large and it may be necessary to make the concave surface aspheric to introduce the proper correction in the secondary or sagittal field.

Although in each modification above described I have shown the use of a positive lens element 14 or 14' for protecting the silver layer 16 and for controlling to a certain extent the concentration of the light on the slit 11, it is to be understood that the primary feature of my invention pertains to the formation of an optically curved slit from a plane physical slit and that the invention may be practiced without employing a converging lens element between the slit 11 and the light source 10.

Many modifications can obviously be made by persons skilled in the art without departing from the spirit of my invention, the scope of which is pointed out in the appended claims.

What I claim as my invention and desire to secure by Letters Patent of the United States is:

1. In an optical system, the combination of an objective system uncorrected for curvature of field and a light limiting device comprising means defining a plane slit, a plano-concave lens between the slit and said objective system, the plano side of said lens being in contact with said slit defining means and the concave surface of said lens being so shaped that it forms a virtual image of said slit having a curvature substantially equal to the curvature of field of said objective system.

2. In apparatus for recording and reproducing sound records, the combination of a film, a light source, an objective uncorrected for curvature of field, and a light limiting device located between the light source and the objective, said device comprising a plane slit between and in intimate contact with a plano-convex lens and a plano-concave lens, the plano-concave lens being between said slit and the objective, whereby a virtual image of the slit will appear concave to the objective, said plano-concave lens being of such curvature and refractive index that the curvature of the virtual image substantially equals the curvature of the field of said objective whereby an image of the slit will be projected by the objective onto the film substantially free from curvature of field.

3. An optical system for forming a flat aerial image including a secondary light source consisting of a positive lens and a negative lens having plano surfaces cemented together and means defining a slit between said plano surfaces, a primary light source for illuminating said slit through the positive lens and an objective for forming an aerial image of said secondary light source.

FRED E. ALTMAN.